United States Patent
Leaney

(10) Patent No.: US 9,229,124 B2
(45) Date of Patent: Jan. 5, 2016

(54) METHODS AND SYSTEMS FOR PROCESSING MICROSEISMIC DATA

(75) Inventor: W. Scott Leaney, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 609 days.

(21) Appl. No.: 12/168,066

(22) Filed: Jul. 4, 2008

(65) Prior Publication Data

US 2009/0010104 A1    Jan. 8, 2009

Related U.S. Application Data

(60) Provisional application No. 60/948,403, filed on Jul. 6, 2007.

(51) Int. Cl.
  *G01V 1/00* (2006.01)
  *G01V 1/36* (2006.01)

(52) U.S. Cl.
  CPC .......... *G01V 1/364* (2013.01); *G01V 2210/123* (2013.01); *G01V 2210/679* (2013.01)

(58) Field of Classification Search
  USPC .............. 367/38, 50; 702/13, 14; 181/106
  See application file for complete search history.

(56) References Cited

U.S. PATENT DOCUMENTS

| | | |
|---|---|---|
| 5,372,038 A | 12/1994 | Nicoletis |
| 5,377,104 A * | 12/1994 | Sorrells et al. .................. 702/11 |
| 5,996,726 A | 12/1999 | Sorrells et al. |
| 6,009,043 A * | 12/1999 | Chon et al. ....................... 367/75 |
| 6,947,843 B2 * | 9/2005 | Fisher et al. ..................... 702/13 |
| 6,985,816 B2 | 1/2006 | Sorrells et al. |
| 2004/0008580 A1 | 1/2004 | Fisher et al. |
| 2005/0060099 A1 | 3/2005 | Sorrells et al. |
| 2005/0190649 A1 | 9/2005 | Eisner et al. |
| 2006/0081412 A1 * | 4/2006 | Wright et al. .................. 181/104 |
| 2008/0175101 A1 * | 7/2008 | Saenger et al. .................. 367/43 |
| 2009/0248312 A1 * | 10/2009 | Hsu et al. ......................... 702/15 |
| 2009/0248313 A1 * | 10/2009 | Berkovitch et al. ............. 702/16 |

FOREIGN PATENT DOCUMENTS

| | | |
|---|---|---|
| GB | 2409722 | 7/2005 |
| GB | 2409723 | 7/2005 |
| RU | 2274401 | 6/2006 |
| WO | 2004/034090 | 4/2004 |
| WO | 2006/030310 | 3/2006 |

OTHER PUBLICATIONS

Schlumberger Oilfield Glossary, "Fourier Transform", ID:822, Mar. 6, 2006.*
"Roy White Wavelet Extraction Well-seismic Scanning", Sep. 2004.*
Tromp, "Seismic tomography, adjoint methods, time reversal and banana-doughnut kernels", Geophysics, 2005.*

(Continued)

*Primary Examiner* — Krystine Breier
(74) *Attorney, Agent, or Firm* — Daryl R. Wright; Jody DeStefanis

(57) ABSTRACT

Methods and systems for processing microseismic waveforms. The methods and systems provide determining a measure of waveform fit in the frequency-domain comprising constructing, in the frequency-domain, at least one of an amplitude misfit functional and a cross phase functional between arrivals; and estimating source parameters and/or model parameters.

20 Claims, 12 Drawing Sheets

(56) References Cited

OTHER PUBLICATIONS

Schlumberger Oilfield Glossary, "Fourier Transform", ID: 822, Mar. 6, 2006.*

B. Feignier, R.P. Young, "Moment tensor inversion of induced microseismic events: Evidence of non-shear failures in the −4<−2 moment magnitude range", Geophysical Research Letters, vol. 19, No. 14, Jul. 24, 1992 pp. 1503-1506.

D.R.H. O'Connell, L.R. Johnson, "Second-order moment tensors of micro earthquakes at the geysers geothermal field, California", Bulletin of the Seismological Society of America, vol. 78, No. 5, Oct. 1988, pp. 1674-1692.

To, A.C., et al., "Full waveform inversion of a 3-D source inside an artificial rock", Journal of Sound & Vibration, London, GB, vol. 285, No. 4-5, Aug. 6, 2005, pp. 835-857.

Vasco D.W., Johnson L.R., "Inversion of waveforms for extreme source models with an application to the isotropic moment tensor component", Geophysiccal Journal, vol. 97, 1989, pp. 1-18.

Notice of allowance from the equivalent Russian patent application No. 2010103987.

* cited by examiner

METHODS AND SYSTEMS FOR PROCESSING MICROSEISMIC DATA

RELATED APPLICATIONS

This application claims priority of U.S. Provisional Patent Application Ser. No. 60/948,403, filed 6 Jul. 2007, the entire contents of which are incorporated herein by reference.

FIELD

The present invention relates generally to methods and systems for investigating subterranean formations. More particularly, this invention is directed to methods and systems for detecting and locating microseismic events by inverting three-component microseismic waveform data in the frequency-domain.

BACKGROUND

Microseismic events, also known as micro-earthquakes, are produced during hydrocarbon and geothermal fluid production operations. Typically microseismic events are caused by shear-stress release on pre-existing geological structures, such as faults and fractures, due to production/injection induced perturbations to the local earth stress conditions. In some instances, microseismic events may be caused by rock failure through collapse, i.e., compaction, or through hydraulic fracturing. Such induced microseismic events may be induced or triggered by changes in the reservoir, such as depletion, flooding or stimulation, in other words the extraction or injection of fluids. The signals from microseismic events can be detected in the form of elastic waves transmitted from the event location to remote sensors. The recorded signals contain valuable information on the physical processes taking place within a reservoir.

Various microseismic monitoring techniques are known, and it is also known to use microseismic signals to monitor hydraulic fracturing and waste re-injection. The seismic signals from these microseismic events can be detected and located in space using high bandwidth borehole sensors. Microseismic activity has been successfully detected and located in rocks ranging from unconsolidated sands, to chalks to crystalline rocks.

As discussed above, in order to improve the recovery of hydrocarbons from oil and gas wells, the subterranean formations surrounding such wells can be hydraulically fractured. Hydraulic fracturing is used to create small cracks in subsurface formations to allow oil or gas to move toward the well. Formations are fractured by introducing specially engineered fluids at high pressure and high flow rates into the formations through the wellbores. Hydraulic fractures typically extend away from the wellbore 250 to 750 feet in two opposing directions according to the natural stresses within the formation.

Recently, there has been an effort to monitor hydraulic fracturing and produce maps that illustrate where the fractures occur and the extent of the fractures. Current hydraulic fracture monitoring comprises methods of processing seismic event locations by mapping seismic arrival times and polarization information into three-dimensional space through the use of modeled travel times and/or ray paths. Travel time look-up tables may be generated by modeling for a given velocity model.

Typical mapping methods are commonly known as non-linear event location methods and involve the selection and time picking of discreet seismic arrivals for each of multiple seismic detectors and mapping to locate the source of seismic energy. However, to successfully and accurately locate the seismic event, the discrete time picks for each seismic detector need to correspond to the same arrival of either a "P" or "S" wave and be measuring an arrival originating from the same microseismic or seismic event. During a fracture operation, many hundreds of microseismic events may be generated in a short period of time. Current techniques employed in the industry require considerable human intervention to quality control the time picking results.

Microseismic data analysis traditionally makes use of the difference between picked S and P arrival times to compute the distance and depth of the source; azimuthal polarizations are then used for direction. Inversions typically make use of a modified Geiger's method, based on the classical Levenberg-Marcquardt nonlinear least squares method, to determine optimum locations with uncertainties. Rapid grid search approaches have also been proposed. Location methods that require manual event picking are subjective and time consuming and automated picking approaches, while able to handle large volumes of data, often get misled by noisy and complicated data. Most automatic picking algorithms also do not make use of the noise rejection potential of the full receiver array.

More recently waveform-based approaches have been presented. In one instance, results of a source scanning algorithm applied to earthquake data have been shown. In another instance, a characteristic function based on the product of P and S onset energy ratios has been employed to locate events. In yet another case, results of a 2D elastic migration approach have been shown with event locations inferred where P+S focusing occurred. In yet another instance, the results of an acoustic technique using time reversal or diffraction stack focusing of recorded waveforms have been shown.

The present disclosure is directed to overcoming, or at least reducing the effects of, one or more of the shortcomings that are inherent in the prior microseismic data analysis techniques outlined above. In addition, the important problem of model calibration is addressed, as is the issue of source parameter inversion.

SUMMARY

The present invention meets the above-described needs and others. Specifically, the present disclosure provides a waveform fitting approach to microseismic data processing in contrast to arrival time and full waveform inversion based techniques for microseismic data analysis.

The methods and systems of the present disclosure may be applied to any microseismic operation relating to subterranean formations, including, but not limited to, hydraulic fracture operations. Application of the principles of the present disclosure provides methods and systems for monitoring microseismicity. The monitoring comprises receiving microseismic waveform signals with seismic detectors and estimating source parameters and/or model parameters by inverting the recorded data in the frequency space domain.

In the techniques according to the present disclosure, time picking is obviated, Sv arrivals are included and the complete polarization vector (not just azimuth) is used. The techniques herein relate to an arbitrarily distributed sensor network, and use anisotropic velocity models wherein geometrical spreading, transmission loss and anelastic absorption (Q) are included.

Accordingly, an object of the present disclosure is to provide improved systems and methods for processing microseismic waveform data. A Her object of certain embodiments herein is to provide improved systems and methods that use a waveform-based approach wherein least-squares time-reversal and waveform fitting are used for analyzing three-component microseismic data.

In one aspect herein, either (1) one P and two S source functions are determined or (2) a single source function and up to six components of the source moment tensor or (3) source functions for each component of a source moment tensor are determined through a linear inversion. The linear inversion provides time reversal of the recorded waveforms. In other aspects of the present disclosure, waveform fit objective functions are provided to determine model parameters and/or source parameters through a nonlinear inversion.

In certain embodiments of the present disclosure, a method of processing microseismic data is provided. The method includes acquiring three-component microseismic waveform data; determining a measure of waveform fit in the frequency-domain comprising constructing, in the frequency-domain, at least one of an amplitude misfit functional and a cross-phase functional between arrivals; and estimating source parameters and/or model parameters. In some aspects herein, constructing an amplitude misfit functional comprises determining one or more source functions in the frequency domain using time reversal. In other aspects, the time reversal comprises least-squares time reversal.

In certain embodiments of the present disclosure, determining one or more source functions comprises determining one or more of (1) one P and two S source functions; (2) one source function and at least one component of a source moment tensor; and (3) source functions for each component of a source moment tensor. The determining one or more source functions in the frequency domain using time reversal comprises using an anisotropic velocity model with anelastic absorption (Q). The constructing a cross-phase functional between arrivals comprises constructing a spectral coherence functional averaged over frequency. In some embodiments, a method comprises rotating the waveform data to a geographical East, North, Up (ENU) coordinate system.

The microseismic waveform data may be acquired by a plurality of three-component geophones. In aspects herein, a method may comprise a joint $\chi^2$ likelihood function comprising the amplitude misfit functional and the cross-phase functional with a multivariate prior probability distribution; and maximizing or sampling a posterior probability function using global search techniques. The microseismic waveform data may be acquired during a hydraulic fracturing operation. The microseismic waveform data may be acquired during a perforation operation.

In some aspects of the present disclosure, a method comprises determining one or more source functions in the frequency-domain using Equation 1, below. In other aspects herein, the amplitude misfit functional is represented by Equation 3, below. In yet other aspects of the present disclosure, the cross-phase functional between arrivals is represented by Equation 6, below. In yet other aspects herein, a joint posterior probability function of a model vector m is derived using Equation 10, below.

In some embodiments of the present disclosure, a method comprises generating images of reflection interfaces between a source location and receivers comprising determining one or more source functions in the frequency domain using time reversal; deconvolving three-component residuals; and migrating the deconvolved residuals using a calibrated velocity model to derive locations of reflection interfaces. Other aspects include calibrating a velocity model using absolute arrival times recorded from a perforation shot. Yet other aspects include determining a joint $\chi^2$ likelihood function over a three-dimensional (3D) map for each time window of data, wherein the joint $\chi^2$ likelihood function comprises the amplitude misfit functional and the cross-phase functional with a multivariate prior probability distribution; maximizing or sampling a posterior probability function using global search techniques for each time window of data; and displaying the 3D map as a movie of time evolution of the spatial distribution of coherent, time-reversed seismic energy.

The present disclosure provides a method of deriving model and source parameters from microseismic waveforms, comprising acquiring three-component microseismic waveforms; determining a measure of waveform fit in the frequency-domain comprising constructing, in the frequency-domain, at least one of an amplitude misfit functional and a cross-phase functional between arrivals; and estimating source location, source mechanism, and/or source attributes. In some aspects, a source location comprises a triplet (x, y, z) for each event. In other aspects, a source mechanism comprises one or more of model parameters, anisotropy parameters, model smoothness, model dip, velocity scaling, and anelastic absorption (Q).

In yet other aspects of the present disclosure, the depth-dependence of anisotropy parameters comes from sonic measurements, is driven by sonic measurements or is driven by any proxy for a measure of the volume of clay. In yet other aspects herein, the anelastic absorption (Q) comprises one or more of $Q_p$, $Q_{s1}$, and $Q_{s2}$, where S1 and S2 are unambiguously associated to Sv and Sh in a transversely isotropic medium. In still further aspects of the present disclosure, source attributes comprise one or more of amplitude, dominant frequency, corner frequency, and scalar moment. In further aspects, the amplitude includes the ratio of Sh amplitude to P amplitude.

The present disclosure provides a system of processing microseismic data, comprising an acoustic tool comprising at least one three-component geophone mounted thereon; a computer in communication with the acoustic tool; and a set of instructions executable by the computer that, when executed, acquire three-component microseismic waveform data; determine a measure of waveform fit in the frequency-domain comprising constructing, in the frequency-domain, at least one of an amplitude misfit functional and a cross-phase functional between arrivals; and estimate source parameters and/or model parameters. In certain aspects of the present disclosure, the at least one three-component geophone comprises a plurality of three-component geophones. In other aspects herein, a system may be configured or designed for hydraulic fracturing operations. In yet other aspects, a system may be configured or designed for perforation operations.

Some aspects herein provide a system that may be configured or designed for permanent or passive monitoring operations. A system may be configured or designed for cross-well operations.

Additional advantages and novel features will be set forth in the description which follows or may be learned by those skilled in the art through reading these materials or practicing the invention. The advantages may be achieved through the means recited in the attached claims.

BRIEF DESCRIPTION OF THE DRAWINGS

The accompanying drawings illustrate preferred embodiments and are a part of the specification. Together with the following description, the drawings demonstrate and explain the principles of the present invention.

Throughout the drawings, identical reference numbers designate similar, but not necessarily identical, elements.

DETAILED DESCRIPTION

Figure 1A:
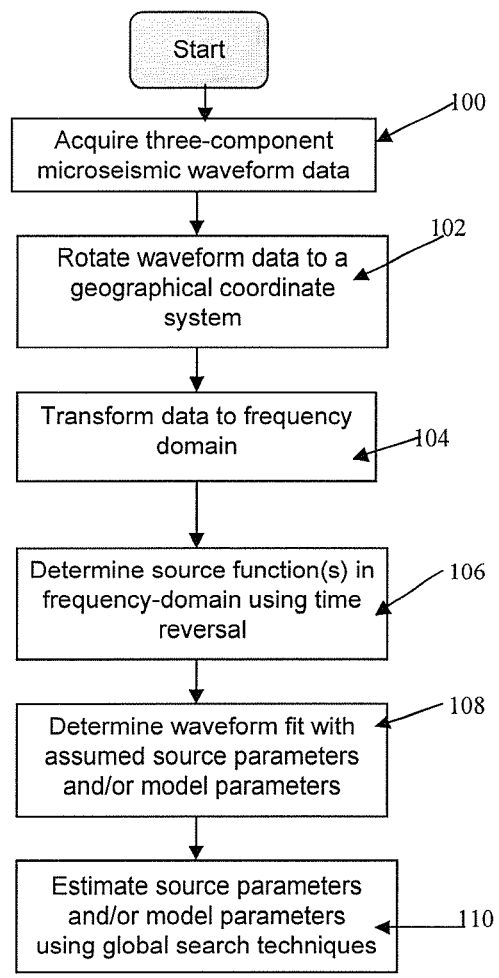
FIGS. 1A and 1B are flowcharts illustrating microseismic data processing techniques according to the description herein.

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The words "including" and "having," as used in the specification, including the claims, have the same meaning as the word "comprising."

The present disclosure contemplates methods and systems utilizing inversion techniques wherein microseismic data recorded by, for example, a network of three component geophones are assumed to be represented as the sum of a compressional (P) and one or two shear (S) arrivals. In some aspects of the present disclosure, at least one arrival of any type is utilized. In other embodiments herein, more than three arrivals may be included.

In aspects of the present disclosure, the inversion techniques are performed in the frequency-space domain. The inversion includes a linear inversion for source waveforms and a nonlinear inversion for model properties or source parameters. The linear inversion effectively reverses time using a ray trace Green's function to recover source waveforms. For the nonlinear inversion a two-part waveform fitting functional is constructed. The first part captures moveout and polarization information through a least squares data misfit. The second part captures information from S and P time differences through a cross-phase spectral coherence functional. The two may be scaled and summed to form a joint $\chi^2$ misfit function, which may be combined with soft prior information in a Bayesian posterior probability function. The present disclosure contemplates using global algorithmic search techniques to maximize the posterior probability function.

The present disclosure contemplates model calibration by inverting controlled source data, for example, perforation shots, from known locations for velocity perturbation, anisotropy, model smoothness and optionally Q. Micro-earthquake source parameters are determined (given the calibrated model) by minimizing the same joint waveform+cross-phase functional using global search techniques. Source parameters (components of the moment tensor) are determined under certain assumptions.

Since the procedure involves fitting waveforms, time picking is not required, but if time picks are available they can be used by including an additional term in the objective function. The full array of receivers and the complete polarization vector are used to enhance the signal to noise ratio of weak arrivals. The presence of a P arrival is not necessary to determine a location. Multiple perforation shots can be inverted simultaneously for optimum model parameters and an arbitrary distribution of receivers (e.g. from multiple wells or surface locations) can be used to invert for location. The inversion permits automated, objective data analysis with quantified uncertainties in estimated parameters.

The present disclosure describes a waveform-based approach wherein least-squares time-reversal and waveform fitting are used for analysis of three component microseismic data. Either (1) one P and (two) S source functions are determined or (2) a single source function is determined but up to six components of the moment tensor are determined through a linear inversion that can be interpreted as the time reversal of recorded waveforms. Waveform fit objective functions are constructed to solve the nonlinear problem of determining either model parameters or source parameters.

Figure 1B:
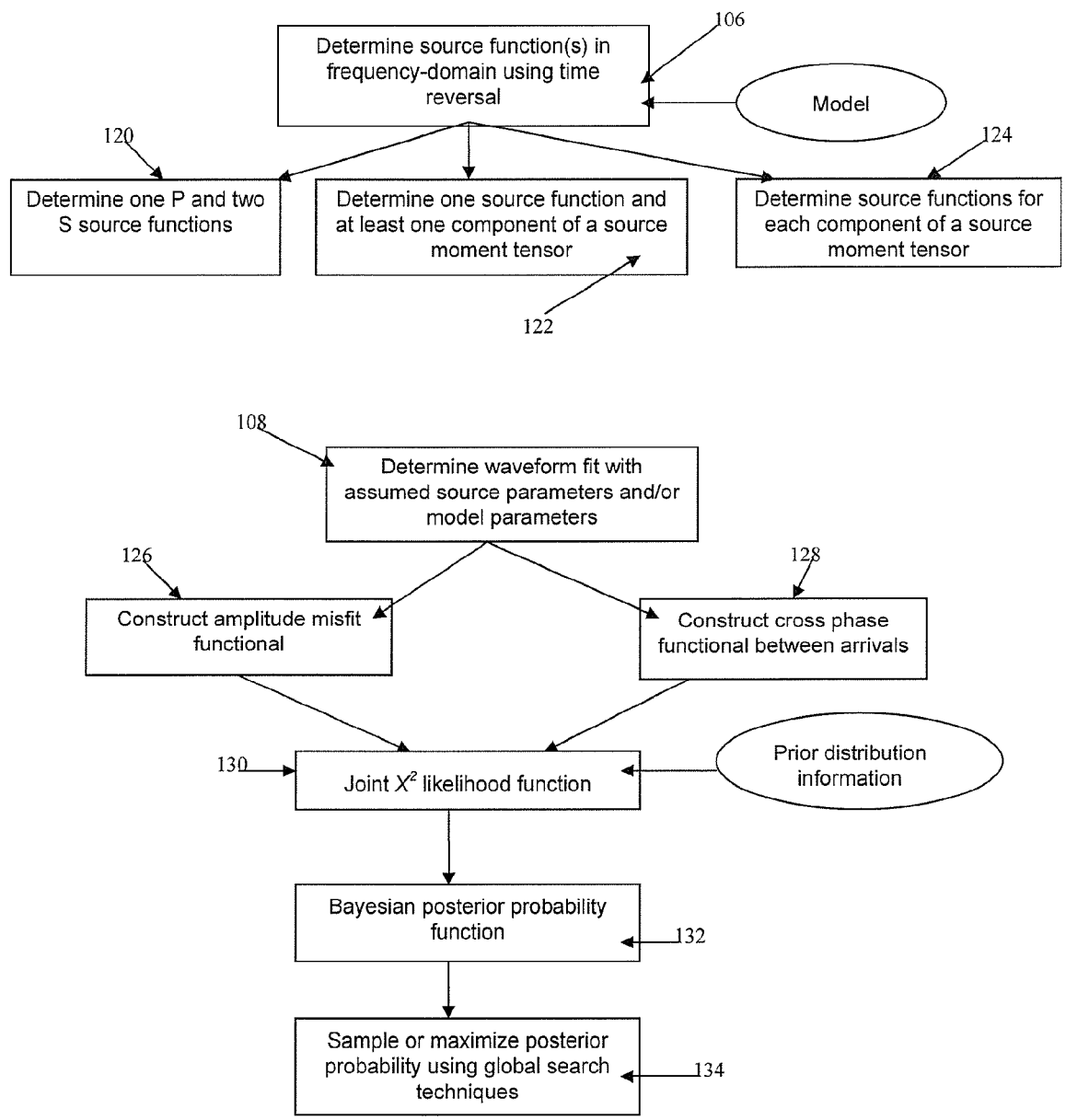

As described in further detail below, the techniques illustrated in the flowcharts of FIGS. 1A and 1B provide estimates of source parameters and/or model parameters.

The techniques of the present disclosure provide novel and efficient quality control (QC) of source and model parameters through the estimation and display, in the time domain, of source functions. In other aspects of the present disclosure, techniques to quantify the optimality of source and model parameters are provided.

Referring to FIG. 1A, three-component microseismic data are acquired (Step 100) using, for example, a network of three-component geophones.

The present disclosure contemplates various types of receivers for the acquisition of microseismic waveforms. Although, the disclosure mentions geophones as one exemplary receiver, it is possible to use any suitable seismic receiver(s) located as desirable or necessary. For example, the receivers may be located at the surface, in horizontal wells, in multiple wells, among others that are known to those skilled in the art. In addition, data may be acquired in a cross-well geometry for purposes of, for example, model calibration.

The waveform data acquired by the receivers may originate from various types of sources, for example, hydraulic fracturing, perforating gun, string shots, among others that are suitable for the purposes described herein. For example, note FIG. 11. In addition, the techniques described herein may be accomplished at data centers located at a well site and/or offsite. Such data centers are known in the art; therefore, the present disclosure does not describe these aspects of the systems in detail.

The acquired waveforms may be rotated to a geographical coordinate system (Step 102), for example, to a geographical East, North, Up (ENU) coordinate system.

The waveform data are transformed to the frequency domain (Step 104). The techniques disclosed herein provide microseismic waveform processing in the frequency domain. In this, processing microseismic data in the frequency domain provides advantages over the time domain such as, but not limited to, ease in treating absorption and dispersion due to Q; treatment of long time records and event coda without a distinct onset; handling time shifts as linear phase shifts, eliminating interpolation; multi-resolution global search algorithms with less computation.

Source functions are determined in the frequency domain using time reversal (Step 106) and a waveform fit functional with assumed source parameters and/or model parameters is determined (Step 108). Source parameters and/or model parameters are estimated using global search techniques (Step 110). These techniques are discussed in detail below.

Global search techniques such as Monte Carlo Markov Chain, Simplex, multi-resolution/multi-grid global search techniques may be utilized according to the principles discussed herein. The present disclosure contemplates that uncertainties in estimated parameters are determined depending on the chosen search technologies. For example, one preferred approach is the Monte Carlo Markov Chain (MCMC), which samples the posterior probability distribution function and exposes tradeoffs between parameters and maps any possible multiple extrema.

FIG. 1B illustrates processing techniques relating to the determination of source functions in the frequency domain using time reversal (Step 106) and determination of the waveform fit using assumed source and/or model parameters (Step 108) in FIG. 1A. The techniques herein have applicability to model calibration and source parameter inversion. Model parameters may include but are not limited to: anisotropy, model smoothness and Q; source parameters may include but are not limited to location (E, N, U), the source moment tensor or the source functions themselves including associated attributes such as amplitudes and their ratios (e.g. Sh/P), dominant frequency, corner frequency and scalar moment.

As depicted in FIG. 1B, one P and two S source functions may be determined (Step 120), one source function and at least one component of a source moment tensor may be determined (Step 122), and/or source functions for each component of a source moment tensor may be determined (Step 124) according to the principles discussed herein.

In FIG. 1B, waveform fit with assumed source parameters and/or model parameters may be determined by constructing at least one of an amplitude misfit functional (Step 126) and/or a cross-phase functional between arrivals (Step 128). The two functionals may be combined as a joint $\chi^2$ likelihood function (Step 130) and, with prior distribution information, a Bayesian posterior probability function is obtained (Step 132). The posterior probability may be maximized or sampled using global search techniques (Step 134).

Prior distribution information includes any prior information that may be utilized to constrain any unknown parameter. For example, within the vector of model parameters the smoothing kernel may be constrained, with the vector of source parameters the location depth may be constrained, etc.

A description is provided of the microseismic data processing techniques according to the present disclosure. Consider a network of three-component geophones at locations x recording vector (3C) data d. The data are assumed to have been oriented to a geographical (east:north:up) coordinate frame and transformed to the frequency domain. At each angular frequency ω the data are assumed to be composed of a compressional (P) and two shear (Sv and Sh) waves arriving at the receivers. For the case of a single source emitting P, Sh and Sv waves and considering only the direct transmitted arrivals, the data may be described by the following equation:

$$d(x_j, \omega) = \sum_{k=1}^{3} u_k(\omega) S_{kj} T_{kj} G_{kj} e^{i\omega t_{kj}} e^{-\pi t_{kj}/Q_{kj}\left(f+i\frac{2f}{\pi}\ln(f/f_r)\right)} h_{kj} \quad (1)$$

where the subscript k denotes the three different wave types (P, Sv, Sh) and j is the receiver index. $u_k(\omega)$ is the displacement source function for the kth wave type; $S_{kj}$ is the source radiation amplitude; $T_{kj}$ is the total transmission loss along the ray; $G_{kj}$ is geometrical spreading; $t_{kj}$ is arrival time; $Q_{kj}$ is the time-weighted harmonic average of (isotropic) Q values along the ray; $f_r$ is the reference frequency for absorption modeling due to Q, the frequency at which there is no phase dispersion; and $h_{kj}$ is the polarization vector at the receiver.

The quantities S, T, G, t, Q and h are computed with ray tracing after making an assumption on the source moment tensor. For example, a layered VTI code exact for times, spreading, transmission losses and polarizations but isotropic for Q and, in the vicinity of the source, for the radiation amplitude may be used for the computation. The source location, $x_S$, has been omitted for brevity in Equation (1), and the dependence of the above listed quantities on the VTI model is implied.

Equation (1) can be written in matrix-vector form with the three unknown source functions $u_k(\omega)$ represented by a model vector $m=(u_p, u_{Sv}, u_{Sh})^T$ and G, an (N×3) complex linear operator (N is the number of receiver components), representing the remainder of the right hand side of Equation (1). Least-squares inversion provides an estimate of m as:

$$\hat{m} = [G^*G + \beta I]^{-1} G^*d, \quad (2)$$

where * signifies complex conjugate transpose, reversing the sign multiplying time in the arguments of the complex exponentials in Equation (1). I is the identity matrix and β is a small scalar.

Equation (1) can be interpreted as a back propagation or time reversal of the recorded data based on the ray trace Green function. After solving Equation (2) at each angular frequency ω and inverse Fourier transforming the source-time functions are recovered, compensated for propagation effects between source location and receivers. Note that the inversion of the matrix G*G, in addition to compensating for amplitude losses (together with G*) also serves to deconvolve out the array response and mitigate wave type interference (crosstalk), subject to the regularization or damping parameter, β. Note also that the projection of the particle motion onto the orthogonal receiver components is undone, returning the scalar source function amplitude.

The present disclosure also provides an objective function to measure how well a candidate source or collection of model parameters reproduces the data. The obvious choice is to plug the estimated $u_k(\omega)$ back into Equation (1) to generate new data, $\hat{d}=G\hat{m}$. Summing over frequency and normalizing by a suitably chosen noise variance allows a $\chi^2$ amplitude misfit functional to be constructed:

$$\chi_a^2 = \frac{1}{N_\omega} \sum_\omega \left[ |d(\omega) - \hat{d}(\omega)|^2 \Big/ \hat{\sigma}_a^2(\omega) \right] \tag{3}$$

where $N_\omega$ is the number of frequencies. It is noted that if $\hat{\sigma}_a^2$ is set equal to the variance of the data then Equation (3) is bounded between 0 and 1 and becomes equal to 1-semblance. In practice $\hat{\sigma}_a^2$ is set equal to the variance of the data divided by the signal-to-noise ratio or SNR. For most real data selecting SNR=2 has been found to produce a $\chi^2$ close to 1.

The amplitude fit objective function of Equation (3) quantifies how well the waveforms are fit given the source and/or model. Equation (3) captures information carried in the moveout and polarizations of the three wave types (P, Sv, Sh) and harnesses the beam steering potential of the array, but the wave types are treated independently—the presence of only one is sufficient to determine a source location using Equation (3).

To capture the information carried in the traditionally used S-P arrival time difference, a functional is constructed based on the phase of the cross spectrum. One such functional is the spectral coherence, defined at each frequency f as:

$$|\gamma_{xy}(f)|^2 = \frac{|S_{xy}|^2}{|S_{xx}||S_{yy}|}, \tag{4}$$

where $$S_{xy} = X(f)Y^*(f)$$

with analogous expressions for $S_{xx}$ and $S_{yy}$. In Equation (4) $S_{xy}$ represents the pair-wise correlation of the estimated source functions $u_k(\omega)$. In practice, expectations are taken in the computation of Equation (4) and it is averaged over pairs of source functions, for example the three pairs: P-Sh, P-Sv, Sh-Sv.

The expectation of Equation (4) is given by:

$$\langle \gamma_{xy}^2 \rangle = \frac{\left(\sum_f \text{Re}\{XY^*\}\right)^2 + \left(\sum_f \text{Im}\{XY^*\}\right)^2}{\left(\sum_f XX^*\right)\left(\sum_f YY^*\right)} \tag{5}$$

which is bounded on [0, 1]. Since it is bounded, it is easily combined with Equation (3) to form a joint likelihood function, and a multivariate prior probability distribution to form a Bayesian posterior probability. By analogy with (3) being equal to 1-semblance for a suitably chosen $\hat{\sigma}_a^2$, using $$\chi_p^2 = (1 - \langle \gamma_{xy}^2 \rangle) \cdot SNR \tag{6}$$

where p signifies "phase", Equation (6) is now analogous to Equation (3) with $$\hat{\sigma}_a^2(\omega) = \frac{1}{M} \sum_{m=1}^{M} |d(\omega)|^2 / SNR \tag{7}$$

where M is the number of geophones (the number of three-component receivers times 3). In spite of the fact that the two misfit functionals Equation (3) and Equation (6) are fundamentally different, they are computed from exactly the same data and so are, by default, given equal weight. Thus, in the total data misfit:

$$\chi_d^2 = [\alpha \cdot \chi_a^2 + (1-\alpha) \cdot \chi_p^2] \cdot N_r, \tag{8}$$

α is by default set to 0.5. $N_r$ is the number of receiver components, i.e., the number of independent data. The difference between Equation (3) and Equation (6) is noted in that cross spectral coherence (Equation 6) will be completely uninformative given the recording of a single arrival type (e.g. Sh only), being as it relies on the correlation of estimated source functions, whereas the amplitude misfit or semblance functional (Equation 3) will remain informative when only a single arrival type is recorded.

To incorporate constraints on nonlinear model parameters, for example, model anisotropies, smoothness, Q or any of the source parameters, a multivariate normal prior probability distribution is assumed. The log-likelihood of a vector of model parameters relative to prior expected values is approximated by assuming zero covariance between model parameters. The contribution of the prior to the joint posterior where i indexes model parameter is:

$$\chi_m^2 = \sum_i (m_i - \mu_i)^2 / \sigma_i^2 \tag{9}$$

where μ is the expected value and σ is the standard deviation. Finally, the joint posterior probability of a particular model vector m given the data d and prior information I is $$p(m|d,I) \propto e^{(-(\chi_d^2 + \chi_m^2)/2)} \tag{10}.$$

where in practice the negative of the logarithm of this is taken in minimization searches except if Monte Carlo sampling approaches are used.

The waveform fit objective functions of Equation (3) and Equation (6), either used separately or in combination, lead to a Bayesian posterior that quantifies how well a given model and source location fit the observed data, optionally subject to a multivariate prior probability distribution. The parameters of primary interest in the microseismic problem, namely the (x, y, z) coordinates of the event location or the parameters chosen to describe the velocity model, enter the problem nonlinearly and are determined by maximizing the posterior using some global search algorithm.

To illustrate the techniques of the present disclosure, a synthetic microseismic data set was generated using a homogeneous anisotropic (VTI) model with the source located 2000 ft away from a single (vertical) monitor well containing 12 receivers spaced at 75 ft apart. The source is located 275 ft below the deepest receiver at an azimuth N138W with a composite source mechanism defined by a vertical fracture striking N5W with 40% double couple, 30% tensional dipole normal to the fracture and 30% isotropic components. Anisotropy values $(\epsilon, \gamma, \delta) = (0.2, 0.25, 0.1)$ and $Qp=Qsh=Qsv=100$ were used, the source wavelet was causal with trapezoidal frequencies 4-150-200-450 Hz. Gaussian noise with standard deviation corresponding to 10% of the P amplitude at the source was added.

Figure 2:
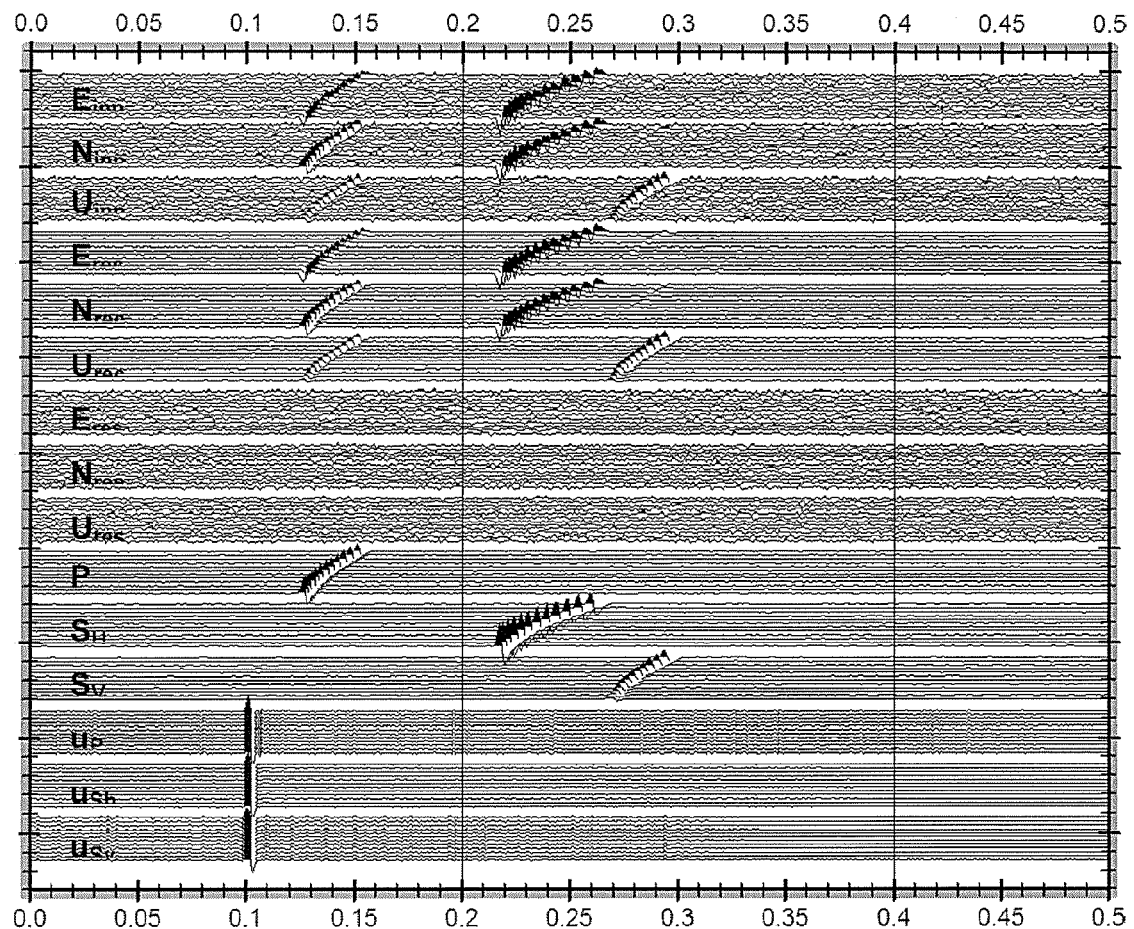
FIG. 2 is a graph depicting synthetic event data with, from top to bottom, the East, North, Up (ENU) input data; the reconstructed ENU data; the residual ENU data; the estimated P, Sh and Sv source functions forward modeled and retained in scalar form; and the estimated source functions at time=0+100 ms repeated 12 times each.

FIG. 2 shows, from top to bottom, the input East, North, Up (ENU) input; the reconstructed ENU data d; the residual ENU data; the estimated P, Sh and Sv source functions forward modeled but retained in their scalar form; and the estimated source functions at t0+100 ms repeated 12 times each. Since the model, source parameters and source mechanism used are the true ones, the residuals (the time domain analog of Equation (3)) contain only noise and the source-time functions are all of identical amplitude. This last aspect is due to the angle-dependence of the source radiation pattern having been "undone" in the least-squares time reversal process (Note Equation 2).

Figure 3:
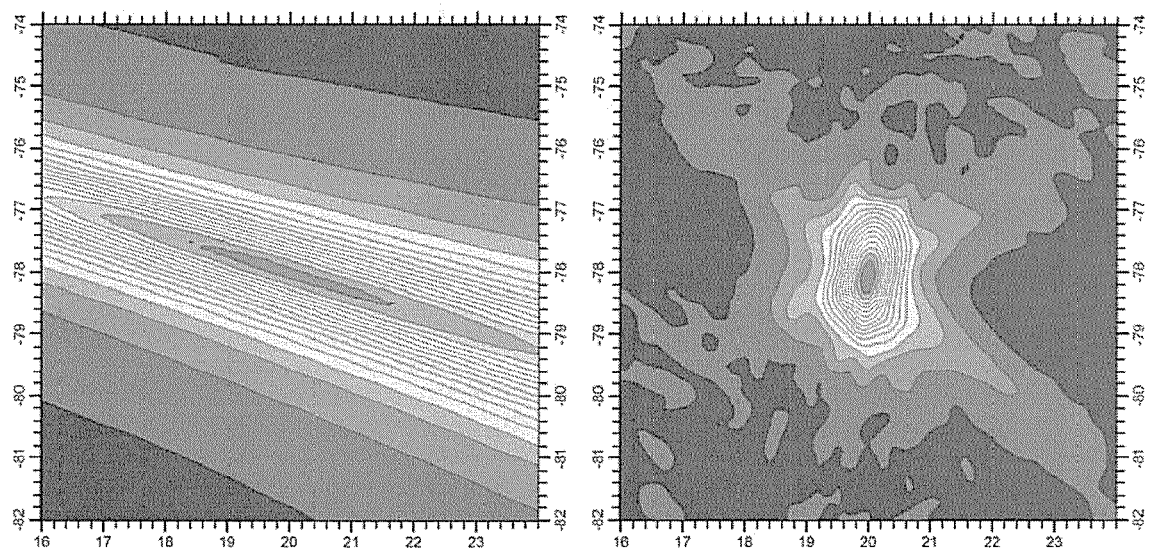
FIG. 3 shows contour plots of the posterior forms of (left) the amplitude misfit functional (Equation 3) and (right) the cross-phase or spectral coherence functional (Equation 6), contoured in the distance-depth plane containing the vertical receiver array. The event is located at (r=2000 ft, z=−7800 ft), the plots have 800 ft on a side.

The waveform fit objective functions, expressed as posterior probabilities, are shown in FIG. 3 computed on a grid in the distance-depth plane containing the source and receivers. The amplitude waveform fit clearly shows the beam-forming effect of the array but has poor resolution along the beam of rays while the spectral coherence functional exhibits, as expected, better localization in distance. The spectral coherence functional actually includes the beam term as it uses the source functions estimated with 3C beam-forming, but it requires the presence of at least two wave types (e.g. P and Sh), whereas the amplitude or beam functional can locate an event with a single wave type, albeit with larger uncertainty in the direction of the ray beam. They can also be used together, for example, to search for optimum model parameters.

Prior to locating microseismic events a velocity model, usually built from sonic logs, must be calibrated. This requires adjusting model parameters, usually anisotropy values, so that a source, e.g., a perforation shot, from an assumed known location locates correctly. Initial model building usually takes the form of averaging or blocking sonic slownesses to construct a layered model. It makes sense to apply some minimum amount of smoothing to the sonic slownesses before blocking, since seismic waves themselves respond to average properties. The length of the moving average filter should be related to the wavelength of the dominant frequency. Using the minimum shear velocity, for example, 7500 ft/sec, and 250 Hz for dominant frequency, leads to a smoothing filter 30 ft in length. More smoothing may be applied if lateral variations or depth uncertainties are present, the idea being to remain uncommitted to what we are uncertain about.

Figure 4:
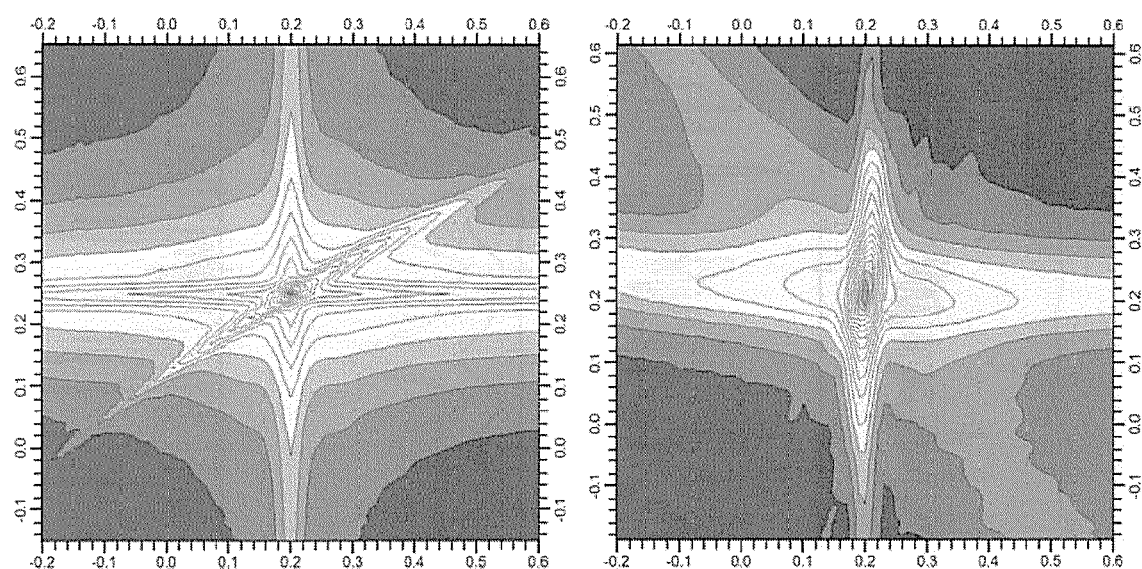
FIG. 4 shows contour plots of the joint posterior (Equation 10) contoured for ranges of two anisotropy values holding the third value fixed at the correct value. Left: $\gamma$ versus $\epsilon$; right: anellipticity versus $\epsilon$.

Assuming a known source position the model anisotropy can be determined by maximizing the waveform fit posterior described in the previous section. FIG. 4 shows contour maps of the joint posterior for the synthetic data of FIG. 2, centered on the true values of the anisotropy parameters. Shown are Thomsen's $\gamma$ versus $\epsilon$ holding $\delta$ fixed at the correct value and anellipticity (Schoenberg's) versus $\epsilon$ holding $\gamma$ fixed at the correct value. Of note is the trade-off between $\epsilon$ and $\gamma$. Anisotropy also trades off against geometry, and against a scaling of P and S velocities.

A variety of options for model calibration are possible, including inverting for anisotropy, velocity scaling (an approximation for geometry errors), Q, and even optimum model smoothness. Anisotropy parameter values may be set to values coming from sonic logging or their magnitudes may be driven by an auxiliary log, for example, a gamma ray log or the log of Vp/Vs, both serving as a proxy for Vclay (volume of clay, assumed to be responsible for anisotropy in the case of VTI). Monte Carlo sampling approaches are used in a global search for model optimum parameters, allowing trade-offs between parameters to be uncovered and providing uncertainty estimates for model unknowns.

Figure 5:
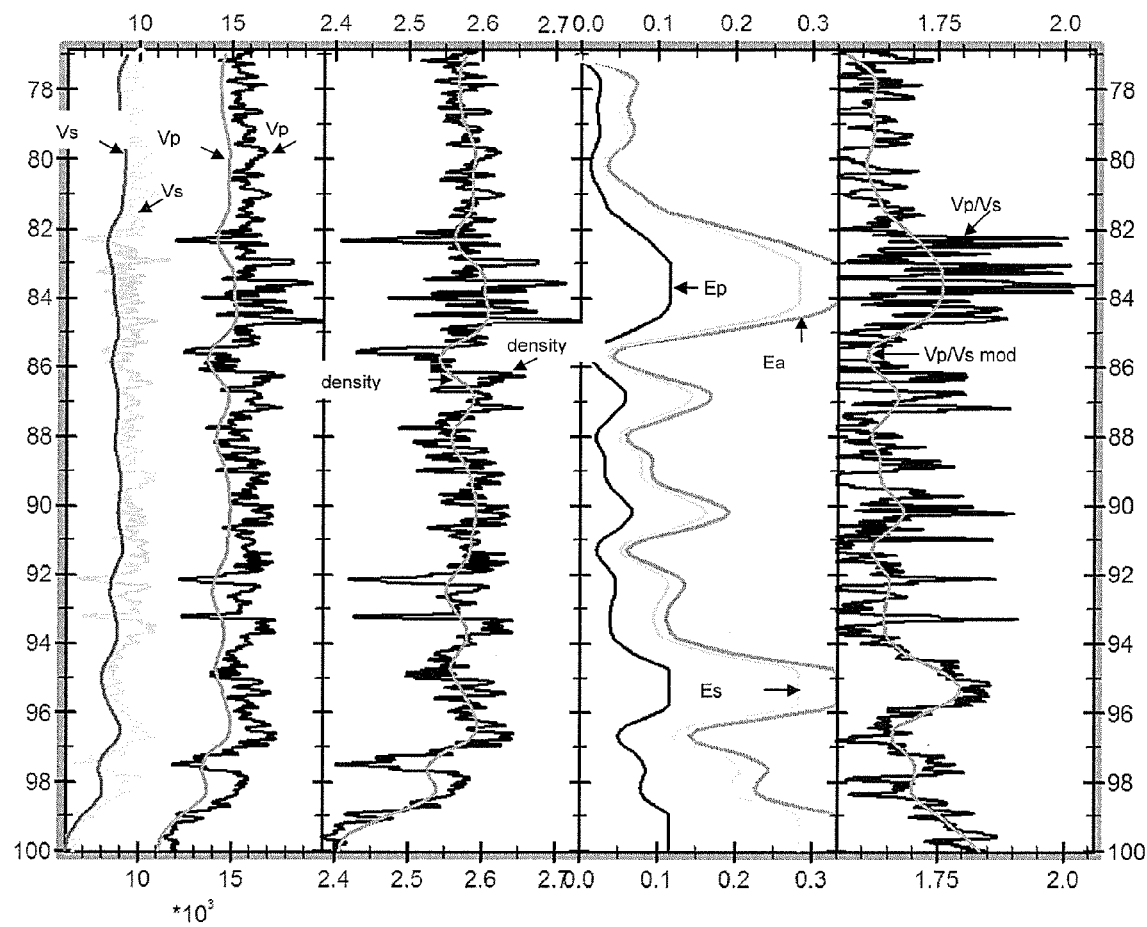
FIG. 5 shows logs and the optimally smooth, anisotropic velocity model. Anisotropy magnitudes are driven by the logged Vp/Vs ratio and a constant velocity scale factor has been determined.
Figure 6:
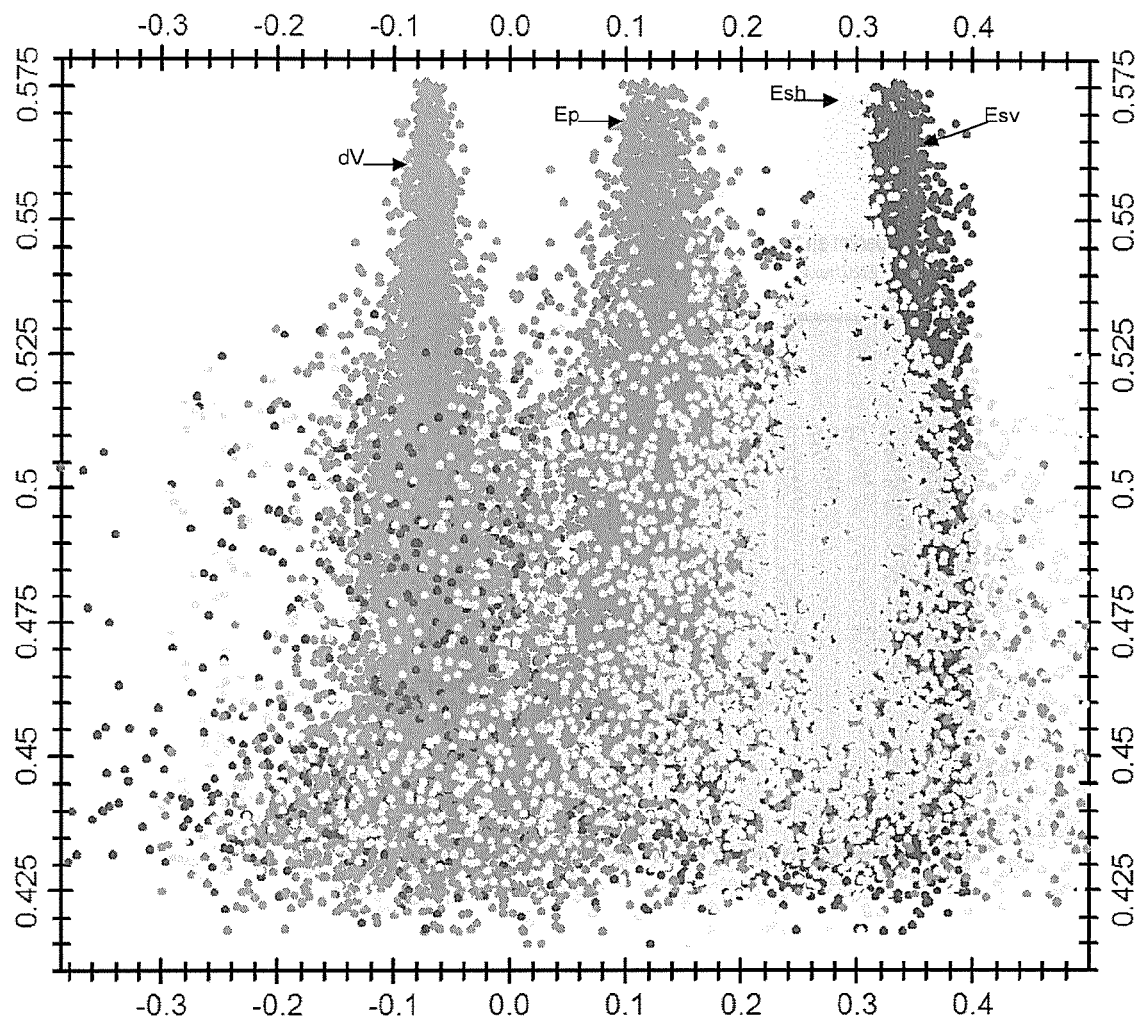
FIG. 6 depicts a combined posterior (Equation 10) during a simulated annealing sampling during a perforation shot model calibration. Velocity scaling (dV) and three anisotropy parameters are shown (model smoothness is not shown).
Figure 7:
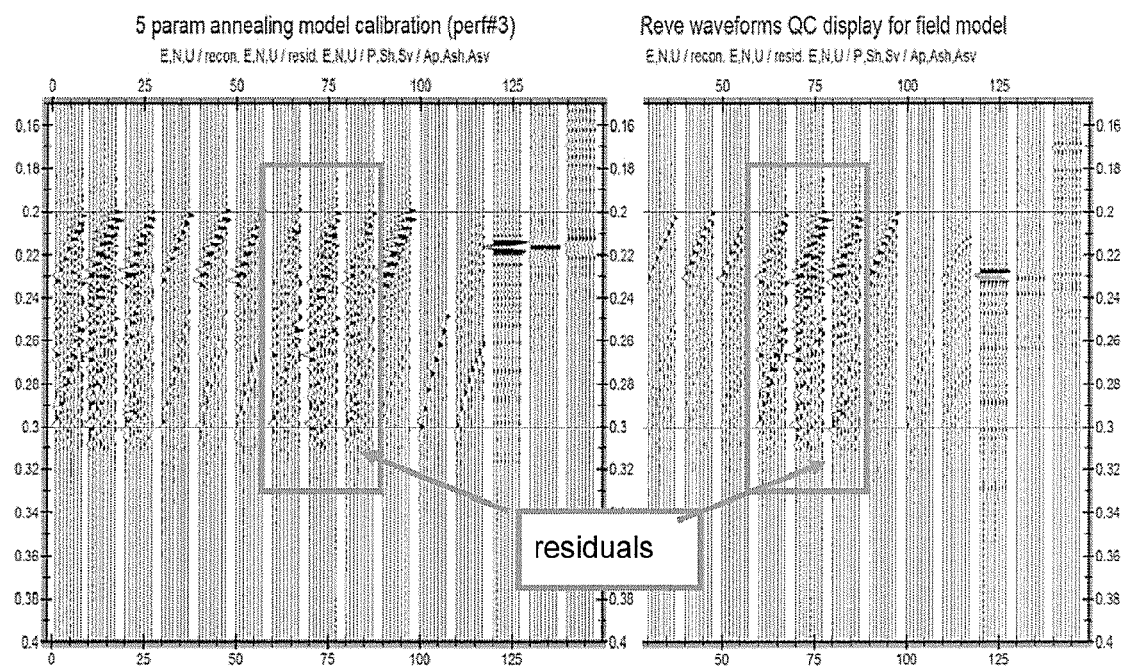
FIG. 7 illustrates graphically perforation shot waveforms with the same order of display as FIG. 2 for the five parameter annealing model calibration (left, present disclosure) and the field model (right).

FIG. 5 shows a model recovered by fitting waveform data from a perforation shot. Five model parameters were estimated using a simulated annealing algorithm to maximize the joint posterior (Note Equation (10)). No prior constraint on model parameters was used. FIG. 6 shows the posterior for four of the model parameters whose values were sampled during the simulated annealing process. FIG. 7 shows the perforation shot waveform data used in model calibration and the corresponding waveforms when the field model is used. The residuals are smaller and the source functions better aligned and of greater amplitude with the waveform fit-calibrated model.

Figure 8:
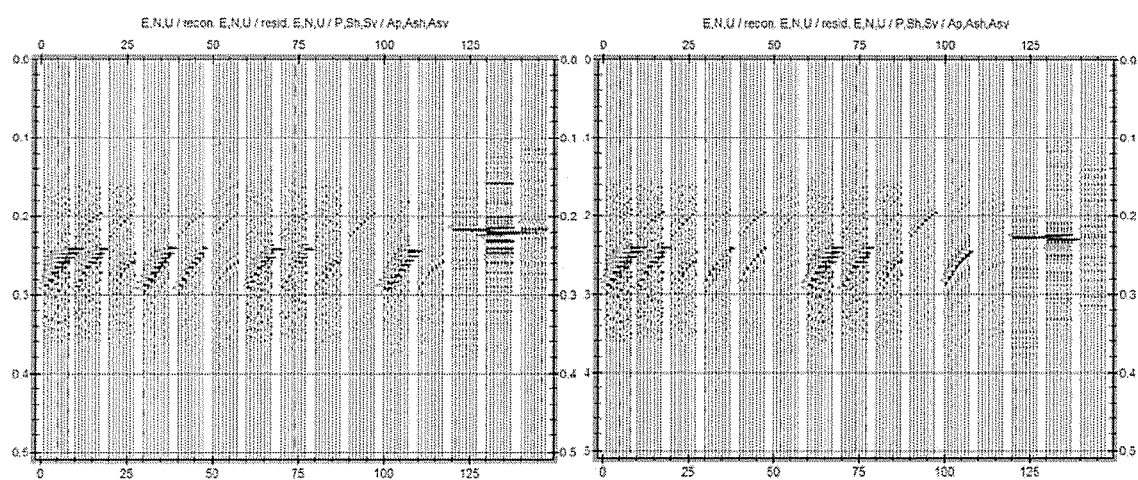
FIG. 8 displays in graphs microseismic event waveforms with the same order of display as FIG. 2 using the five parameter annealing model from FIG. 6 (left, present disclosure) and the field model (right).

The result of applying least-squares time reversal and waveform fitting to a real microseismic event is shown in FIG. 8, using the calibrated model previously determined, and the field model. Again the waveform fit residuals are smaller and less coherent, the estimated source functions are of greater amplitude and the Sv source function now appears significant. It is noted that the source radiation $S_{jk}$ has been set to 1 here, effectively averaging radiation amplitude over inclination angle. But with a modification to Equation (1), the present techniques can be used to invert for the moment tensor responsible for the source radiation pattern.

The forward model described by Equation (1) assumes three (P, Sh, Sv) source functions $u_k(\omega)$ are present, using an assumed source radiation pattern $S_{jk}$. In fact $S_{jk}$ is computed given the (six) coefficients ($M_{xx}, M_{yy}, M_{zz}, M_{xy}, M_{xz}, M_{yz}$) of a moment tensor and the ray angles at the source ($\theta$, $\phi$). Equation (1) can therefore be modified to invert for six source functions instead of three, or it can be modified to invert for a single source function $u_k(\omega)$ and the six coefficients of the source moment tensor. Since recordings in a single vertical borehole do not constrain all coefficients of the moment tensor, a further embodiment of the present disclosure allows for the recovery of a limited or reduced moment tensor. One inversion is the recovery of the relative amounts of double couple and extensional dipole emanating from a vertical fracture plane. This problem has two non-zero moments and one nonlinear parameter, the fracture plane azimuth.

Figure 9:
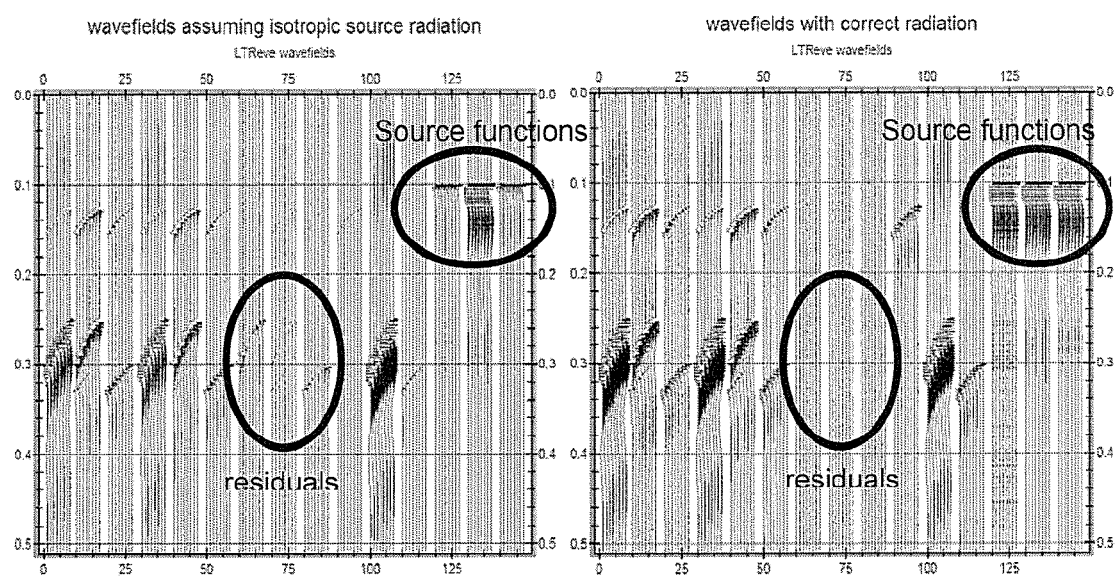
FIG. 9 illustrates synthetic microseismic event waveforms from a composite moment tensor source with the same order of display as FIG. 2. Left: constant, omni-directional radiation and right: using the correct moment tensor.

As a demonstration of being able to invert for components of the moment tensor it is shown how least-squares time reversal can be used for source characterization. A synthetic and a real data set will be used. A synthetic was generated with a composite source mechanism and source functions were estimated with $S_{jk}=1$ and with $S_{jk}$ corresponding to the true moment tensor. FIG. 9 shows the waveform display where the residuals are clearly seen to be significant when a constant radiation is used, and the source functions vary in amplitude. A simple but effective way to look at the data is to compute attributes of the source functions under the assumption $S_{jk}=1$. Then a source mechanism can be assumed and attributes recomputed. This approach will be shown on a real data set.

Figure 10:
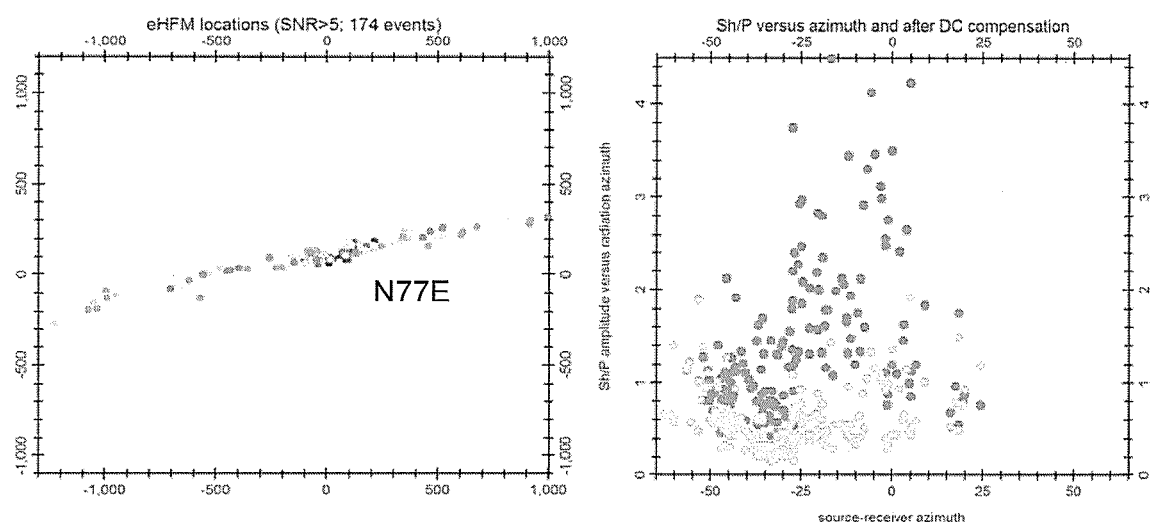
FIG. 10 shows: Left: Real microseismic event locations versus event time. Right: Sh/P amplitude ratio from least-squares time reversal versus source-receiver azimuth assuming a constant source amplitude (dark dots) and assuming a pure double couple source with vertical fracture plane striking N77E.

One of the advantages of the least-squares time reversal approach is that scalar amplitude source functions are estimated, compensated for propagation losses. The attributes may be the amplitude spectra themselves, from which corner frequency and associated source moment attributes may be determined, or the source spectra may be used to get source type amplitude or dominant frequency. A commonly used attribute is the ratio of Sh/P amplitudes, a well known diagnostic of a double couple source, since there are nulls in P radiation at four azimuths. FIG. 10 shows a collection of real event locations from a hydraulic fracturing experiment trending N77E. The monitor well receiver array was located to the NNW of (0,0).

The left graph in FIG. 10 illustrates event locations as a function of time with the darker dots being earlier events and the lighter dots later events. The left graph indicates a fracture plane striking N77E corresponding to the source functions in the right graph. Also shown are the Sh/P amplitude ratios versus source-receiver azimuth from estimated source functions after least-squares time reversal using $S_{jk}=1$, and using $S_{jk}$ corresponding to a pure double couple source with a vertical fracture plane striking N77E. For this source mechanism there should be a maximum in Sh/P at N13W since at this azimuth there is a null in the P radiation. Indeed this is what is observed in the dark dots in the right graph. The lighter dots show the Sh/P ratio when the pure double couple source mechanism is assumed, essentially backing out or compensating for the radiation pattern as part of the time-reversal process. If the source mechanism were correct, in this case a pure double couple, the ratios should be close to one. While the lighter dots show a flatter trend they are over-corrected, indicating a mechanism with a larger P amplitude and hence a composite source mechanism with non-double couple equivalent forces.

The forward model described by Equation (1) assumes three (P, Sh, Sv) direct arrivals, with source energy propagating through a layered VTI medium (the often used prefix "q" standing for "quasi" in qP or qSv has been suppressed). More arrivals could be included in the forward model, such as head waves, mode conversions and even reflections. In addition to handling more arrivals in the forward model a more general modeling kernel can also be used. While the present implementation uses layered VTI models, more general models containing dip and lower symmetries of anisotropy are straight forward to incorporate.

The frequency domain formulation means that precise time localization is lost. Consequently, if multiple events are present within the chosen time window and they come from different locations they would be incorrectly located. To overcome this problem a 3D posterior volume may be considered for event location, with multiple peaks located above a threshold. Using this approach, arrivals without a readily identifiable onset or events clustered tightly in time can be mapped, under the assumption of the same source mechanism for all data in the time window.

The joint amplitude+cross-spectrum data likelihood functional has been used here in a nonlinear search, but it can also be converted to a measure of focusing, computed over a 3D volume for each time window of data. Such 3D maps can be viewed as a movie to observe the time evolution of the spatial distribution of seismic energy.

A further possibility is to produce reflection images of interfaces between the determined source location and receivers. The inverted source functions would first be used to deconvolve the 3C residuals, then these residuals (within which reflections would be present) would be migrated to their positions using the calibrated velocity model. The process of deconvolving the 3C residuals with the inverted source functions will have a two-fold effect: 1) to remove the source origin time (t0), 2) to remove the phase of the source wavelet so that migrated images can be zero-phase. While the typical hydraulic fracturing monitoring geometry would produce a very limited zone of illumination, events from shallower treatment stages should provide images of deeper treated zones.

A waveform-based method to invert microseismic data has been described. Operating in the frequency domain, three (P, Sh, Sv) source functions or a single source function and the components of a source moment tensor are estimated by a process referred to as least-squares time reversal, where the factors acting on the source function due to propagation from source to receivers are mathematically reversed through least-squares inversion. Having estimated the source functions two objective functions have been constructed to quantify how well waveforms are fit. One is a conventional $\chi^2$ measure which captures information carried in moveouts and polarizations; the other is based on spectral coherence and captures information carried in the cross-phase or arrival time differences. These may be combined in a single likelihood function and with a prior distribution to construct a Bayesian posterior probability. Optimum model parameters are inverted using data from sources at assumed known locations; source parameters are inverted given the optimum model. A variety of stochastic and iterative searches are used.

The approach of waveform fitting is, not surprisingly, computationally more demanding than arrival time-based approaches, falling somewhere between those and full waveform inversion. In this approach, time picking is obviated, Sv arrivals are included and the complete polarization vector (not just azimuth) is used. The present algorithm implementation handles an arbitrarily distributed sensor network and uses layered VTI models including spreading, transmission loss and Q.

The techniques of the present disclosure have applicability in areas such as hydraulic fracture monitoring, waste reinjection, carbon dioxide sequestration, permanent or passive monitoring, steam assisted heavy oil recovery, among others that are known to those skilled in the art. The techniques described herein provide novel and useful results such as calibrated velocity models for other applications, such as real time event location; inversions for source mechanism or moment tensor; deconvolution and migration of residuals, such as head waves, reflections from impedance contrasts, multiply reflected arrivals, using estimated source functions; mapping of bed boundaries using the located reflectors; mapping of fractures.

Figure 11:
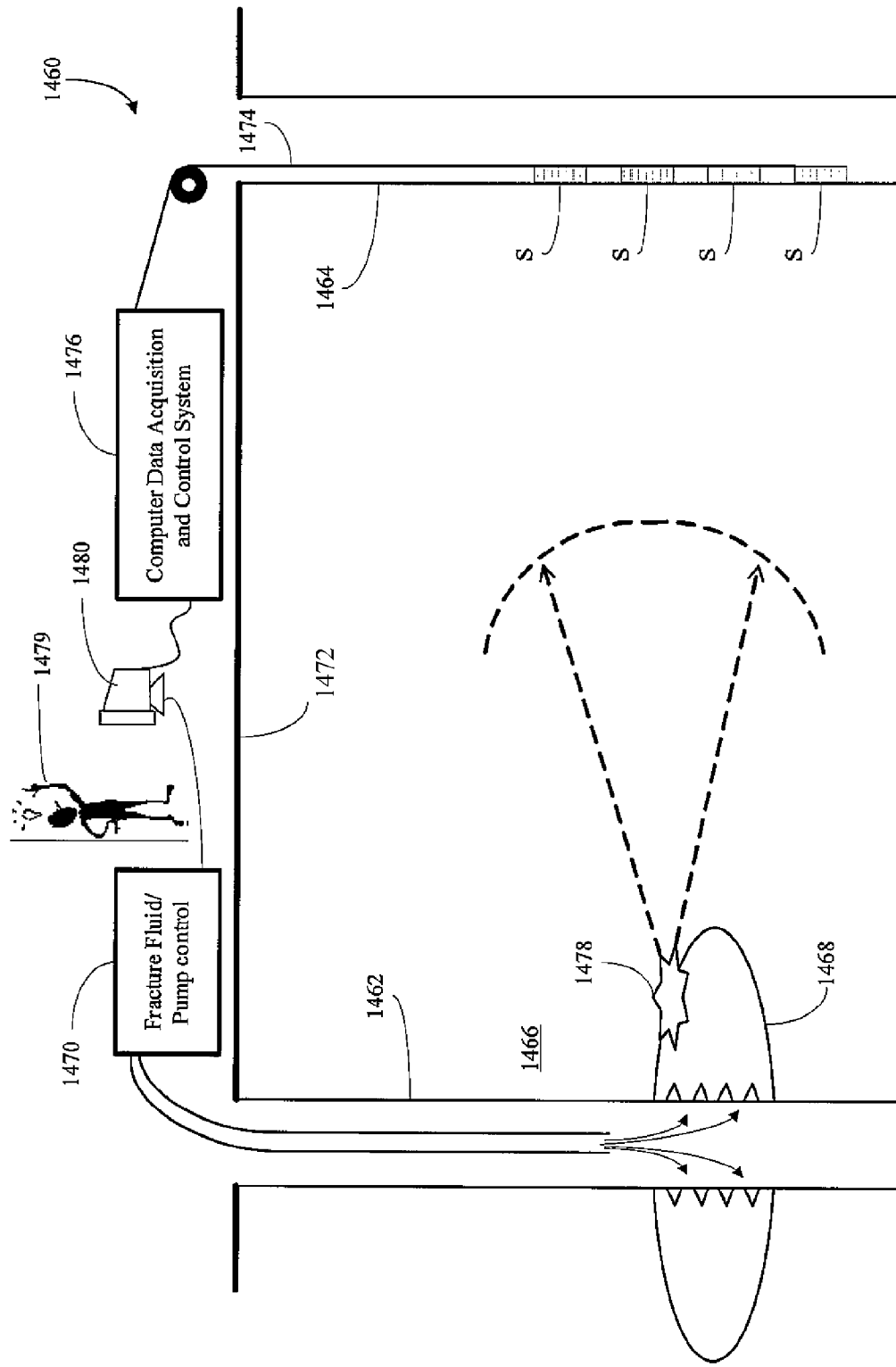
FIG. 11 illustrates an exemplary system according to one embodiment of the present disclosure.

The methods and systems described above may be implemented, for example, by a system 1460 shown in FIG. 11. The system 1460 may be arranged with respect to a first and a second wellbore 1462, 1464. The first wellbore 1462 traverses a formation 1466 with a zone 1468 that is scheduled for hydraulic fracture. A hydraulic fracture apparatus 1470 comprising a fracture fluid, a pump, and controls is coupled to the first wellbore 1462. The second wellbore 1464 contains one or more, and in aspects of the present disclosure a plurality, of temporary or permanent seismic sensors S. Alternatively, the sensors S may be placed along a surface 1472 or within the first wellbore 1462. A communication cable such a telemetry wire 1474 facilitates communication between the sensors S and a computer data acquisition and control system 1476. As a fracture job commences, fracture fluid is pumped into the first wellbore 1462, creating microseismic events 1478 as the zone 1468 cracks and propagates. The microseismic events 1478 create seismic waves that are received by detectors of the sensors S.

The microseismic waveforms received by the sensors S may be used to detect and locate microseismic events caused by the fracture operation. Accordingly, based on the microseismic waveforms received, computers, such as the computer data acquisition and control system 1476, may run programs containing instructions, that, when executed, perform methods according to the principles described herein. Furthermore, the methods described herein may be fully automated and able to operate continuously in time for monitoring, detecting, and locating microseismic events. An operator 1479 may receive results of the methods described above in real time as they are displayed on a monitor 1480. The operator 1479 may, in turn, for example, adjust hydraulic fracture parameters such as pumping pressure, stimulation fluid, and proppant concentrations to optimize wellbore stimulation based on the displayed information relating to detected and located microseismic events.

The embodiments were chosen and described in order to best explain the principles of the invention and its practical applications. The preceding description is intended to enable others skilled in the art to best utilize the invention in various embodiments and with various modifications as are suited to the particular uses contemplated. It is intended that the scope of the invention be defined by the following claims.

What is claimed is:

1. A method of processing microseismic data, comprising:
  acquiring three-component microseismic waveform data with at least one receiver;
  determining a measure of waveform fit in the frequency-domain comprising:
    constructing, in the frequency-domain an amplitude misfit functional wherein constructing includes utilizing time reversal determined by a matrix inversion;
    estimating source parameters and/or model parameters; and
  displaying microseismicity results using estimated source parameters and/or model parameters; and
  further comprising a joint $\chi^2$ likelihood function comprising the amplitude misfit functional and a cross-phase functional, constructed in the frequency-domain wherein constructing includes utilizing time reversal determined by a matrix inversion, with a multivariate prior probability distribution; and maximizing or sampling a posterior probability function using global search techniques.

2. A method of processing microseismic data according to claim 1, wherein the matrix inversion is determined from wavefield parameters.

3. A method of processing microseismic data according to claim 1, further comprising rotating the waveform data to a geographical East, North, Up (ENU) coordinate system.

4. A method of processing microseismic data according to claim 1, wherein the microseismic waveform data are acquired by a plurality of three-component geophones.

5. A method of processing microseismic data according to claim 1, wherein the microseismic waveform data are acquired during a hydraulic fracturing operation.

6. A method of processing microseismic data according to claim 1, wherein the microseismic waveform data are acquired during a perforation operation.

7. A method of processing microseismic data according to claim 1, further comprising determining one or more source functions in the frequency-domain using:

$$d(x_j, \omega) = \sum_{k=1}^{3} u_k(\omega) S_{kj} T_{kj} G_{kj} e^{i\omega t_{kj}} e^{-\pi t_{kj}/Q_{kj}\left(f+i\frac{2f}{\pi}\ln(f/f_r)\right)} h_{kj}$$

wherein:
d is the waveform data acquired by a plurality of three-component geophones at locations x;
$\omega$ is angular frequency;
k represents three different wave types (P, Sv, Sh);
j is receiver index;
$u_k(\omega)$ is displacement source function for the kth wave type;
$S_{kj}$ is source radiation amplitude;
$T_{kj}$ is total transmission loss along the ray;
$G_{kj}$ is geometrical spreading;
$t_{kj}$ is arrival time;
$Q_{kj}$ is the time-weighted harmonic average of (isotropic) Q values along the ray;
$f_r$ is reference frequency for absorption modeling due to Q, the frequency at which there is no phase dispersion; and
$h_{kj}$ is the polarization vector at the receiver.

8. A method of processing microseismic data according to claim 1, wherein the amplitude misfit functional is:

$$\chi_a^2 = \frac{1}{N_\omega} \sum_\omega \left[ |d(\omega) - \hat{d}(\omega)|^2 / \hat{\sigma}_a^2(\omega) \right]$$

wherein:
d is data recorded by a network of three-component geophones;
$\hat{d}$ is data generated using estimated source functions $u_k(\omega)$;
$\omega$ is angular frequency;
$N_\omega$ is the number of frequencies; and $$\hat{\sigma}_a^2(\omega) = \frac{1}{M} \sum_{m=1}^{M} |d(\omega)|^2 / SNR.$$

9. A method of processing microseismic data according to claim 1, further comprising generating a joint posterior probability function of a model vector m using:

$$p(m|d,I) \propto e^{(-(\chi_d^2 + \chi_m^2)/2)}$$

wherein:
d is the waveform data acquired by a plurality of three-component geophones at locations x;
I is prior model distribution information;

$$\chi_d^2 = [\alpha \cdot \chi_a^2 + (1 - \alpha) \cdot \chi_p^2] \cdot N_r;$$

and $$\chi_m^2 = \sum_i (m_i - \mu_i)^2 / \sigma_i^2,$$

where $\mu$ is the expected value and $\sigma$ is the standard deviation.

10. A method of processing microseismic data according to claim 1, further comprising generating images of reflection interfaces between a source location and receivers comprising:

determining one or more source functions in the frequency domain using time reversal;

deconvolving three-component residuals; and migrating the deconvolved residuals using a calibrated velocity model to derive locations of reflection interfaces.

11. A method of processing microseismic data according to claim 1, further comprising calibrating a velocity model using absolute arrival times recorded from a perforation shot.

12. A method of processing microseismic data, comprising:

acquiring three-component microseismic waveform data with at least one receiver;

determining a measure of waveform fit in the frequency-domain comprising:

constructing, in the frequency-domain an amplitude misfit functional wherein constructing includes utilizing time reversal determined by a matrix inversion;

estimating source parameters and/or model parameters;

displaying microseismicity results using estimated source parameters and/or model parameters;

determining a joint $\chi^2$ likelihood function over a three-dimensional (3D) map for each time window of data, wherein the joint $\chi^2$ likelihood function comprises the amplitude misfit functional and a cross-phase functional, constructed in the frequency-domain wherein constructing includes utilizing time reversal determined by a matrix inversion, with a multivariate prior probability distribution;

maximizing or sampling a posterior probability function using global search techniques for each time window of data; and displaying the 3D map as a movie of time evolution of the spatial distribution of coherent, time-reversed seismic energy.

13. A method of processing microseismic data, comprising:

acquiring three-component microseismic waveform data with at least one receiver;

determining a measure of waveform fit in the frequency-domain comprising:

constructing, in the frequency-domain a cross-phase functional between arrivals wherein constructing includes utilizing time reversal determined by a matrix inversion;

estimating source parameters and/or model parameters; and displaying microseismicity results using estimated source parameters and/or model parameters.

14. A method of processing microseismic data according to claim 13, wherein constructing a cross-phase functional between arrivals comprises constructing a spectral coherence functional averaged over frequency.

15. A method of processing microseismic data according to claim 13, wherein the cross-phase functional between arrivals is:

$$\chi_p^2 = (1 - \langle \gamma_{xy}^2 \rangle) \cdot SNR$$

wherein:

SNR is signal-to-noise ratio;

$$|\gamma_{xy}(f)|^2 = \frac{|S_{xy}|^2}{|S_x||S_y|}; \text{ and}$$

p represents phase.

16. A system of processing microseismic data according to claim 13, wherein the at least one three-component geophone comprises a plurality of three-component geophones.

17. A system of processing microseismic data according to claim 13, wherein the system is configured or designed for hydraulic fracturing operations.

18. A system of processing microseismic data according to claim 13, wherein the system is configured or designed for perforation operations.

19. A system of processing microseismic data according to claim 13, wherein the system is configured or designed for permanent or passive monitoring operations.

20. A system of processing microseismic data according to claim 13, wherein the system is configured or designed for cross-well operations.

* * * * *